United States Patent [19]
Sperduti et al.

[11] Patent Number: 5,275,253
[45] Date of Patent: Jan. 4, 1994

[54] PART-TIME TRANSFER CASE WITH TRACTION CONTROL

[75] Inventors: David Sperduti, Auburn; Randolph C. Williams, Weedsport; James S. Brissenden, Baldwinsville; Randy W. Adler, Seneca Falls, all of N.Y.

[73] Assignee: New Venture Gear, Inc., Troy, Mich.

[21] Appl. No.: 27,956

[22] Filed: Mar. 8, 1993

Related U.S. Application Data

[63] Continuation-in-part of Ser. No. 724,848, Jul. 2, 1991, Pat. No. 5,215,160.

[51] Int. Cl.⁵ .................. B60K 17/34; B60K 17/344; B60K 23/08; B60K 28/16
[52] U.S. Cl. .................... 180/197; 180/233; 180/244; 180/247; 180/248; 364/426.02; 364/426.03; 475/221
[58] Field of Search ............... 180/233, 244, 247, 248; 364/426.02, 426.03; 475/221, 223

[56] References Cited

U.S. PATENT DOCUMENTS

| | | | |
|---|---|---|---|
| 4,417,641 | 11/1983 | Kageyama | 180/247 |
| 4,484,653 | 11/1984 | Horikoshi et al. | 180/233 |
| 4,561,520 | 12/1985 | Fogelberg | 180/247 |
| 4,757,870 | 7/1988 | Torii et al. | 180/233 |
| 4,773,500 | 9/1988 | Naito et al. | 180/233 |
| 4,989,686 | 2/1991 | Miller et al. | 180/197 |
| 5,033,575 | 7/1991 | Takeshita et al. | 180/249 |
| 5,046,576 | 9/1991 | Miyawaki | 180/233 |
| 5,057,062 | 10/1991 | Yamasaki et al. | 180/248 |
| 5,215,160 | 6/1993 | Williams et al. | 180/197 |

OTHER PUBLICATIONS

SAE Technical Paper Series 892538 (Electronic Transfer Case For 1990 Aerostar Electronic Four Wheel Drive, John Richardson, Ford Motor Company, Wes Dick, Dana Corporation, Nov. 6-9, 1989.

*Primary Examiner*—Mitchell J. Hill
*Attorney, Agent, or Firm*—Harness, Dickey & Pierce

[57] ABSTRACT

The present invention provides a motor vehicle traction control system for providing on-demand four-wheel drive under certain tractive and operational conditions. The present invention is operable for disabling the on-demand four-wheel drive feature upon the vehicle operator subsequently shifting into the four-wheel drive mode.

18 Claims, 6 Drawing Sheets

PART-TIME TRANSFER CASE WITH TRACTION CONTROL

CROSS-REFERENCE TO RELATED APPLICATION

This application is a continuation-in-part of application Ser. No. 07/724,848, filed Jul. 2, 1991 now U.S. Pat. No. 5,215,160 issued Jun. 1, 1993.

BACKGROUND OF THE INVENTION

The present invention relates generally to a motor vehicle traction control system and, more particularly, to a part-time transfer case incorporating tractive control means for providing "on-demand" four-wheel drive operation during low traction road conditions.

In general, power transfer mechanisms are used in association with both manual and automatic transmissions for selectively directing power to the wheels of a motor vehicle. One type of conventional power transfer mechanism typically used in four-wheel drive applications is a full-time transfer case which continuously transfers engine power (i.e. torque) to both the front and rear axles. It is common for such full-time transfer cases to provide means for selectively interlocking each of the driven axles for preventing any slippage with respect to each other. It is also common to provide an interaxle center differential assembly for permitting modified torque division and speed variations between the axles so as to prevent potentially damaging torque build-up in the drivetrain. Generally, the torque delivered to the front and rear axles is proportionally divided via the interaxle differential assembly installed within the full-time transfer case.

Another type of power transfer mechanism is a part-time transfer case adapted to normally operate in a two-wheel drive mode and which requires the vehicle operator to intentionally and deliberately shift into a four-wheel drive mode. Still another type of power transfer mechanism is an "on-demand" four-wheel drive apparatus, such as a viscous transmission unit, operable for automatically transferring power to the non-driven axle when traction is lost at the drive axle.

With the advent of increased consumer popularity in four-wheel drive passenger cars and sport/utility vehicles, full-time and part-time transfer cases as well as "on-demand" transmission devices are being utilized in a plethora of vehicular driveline applications. One example of a full-time power transfer system is disclosed in SAE Technical Paper No. 892538 entitled "Electronic Transfer Case For 1990 Aerostar Electronic Four-Wheel Drive" by John Richardson and Wes Dick. The full-time transfer case disclosed is incorporated into an all-wheel drive vehicle that is primarily intended for road use as a family car and not as an off-road recreational or sport utility vehicle. This full-time transfer case employs a clutch assembly applied across the center interaxle differential assembly for modifying the torque split in relation to the available traction at each axle. More particularly, the full-time transfer case is a single-speed power transfer apparatus which does not provide a two-wheel drive mode, a low gear four-wheel drive mode nor means for positively over-riding (i.e. locking out) the interaxle differential assembly.

As will be appreciated, a motor vehicle equipped with a part-time transfer case offers the vehicle operator the option of selectively shifting between a two-wheel drive mode during normal road conditions and a four-wheel drive mode best suited for operation under adverse road conditions. However, most conventional part-time transfer cases of the type used in off-road, sport and utility vehicles do not provide an "on-demand" four-wheel drive feature which can be effectively "over-ridden" upon the vehicle operator selectively shifting the transfer case into the four-wheel drive mode to permit off-road and/or recreational use.

SUMMARY OF THE INVENTION

Accordingly, it is an object of the present invention to overcome the disadvantages associated with conventional power transfer devices by providing a motor vehicle traction control system having means for providing "on-demand" four-wheel drive operation which can be effectively "over-ridden" or "locked-out" upon the vehicle operator selectively shifting into the part-time four-wheel drive mode.

It is a further object of the present invention to provide a motor vehicle traction control system having sensor means for sensing the speed of rotation for the front and rear drive shafts, and an electronic control module having circuit means for automatically actuating and controlling the "on-demand" four-wheel drive feature in response to the occurrence of an excessive speed differential between the respective drive shafts. As such, the traction control system is adapted to automatically provide improved traction upon instantaneous and unanticipated occurrences of single wheel or driven axle traction loss when operating in the two-wheel drive mode.

It is another object of the present invention to provide an electronic control module that is adapted to receive and process electrical input signals and make controlled output decisions in response thereto.

Accordingly, the present invention is directed to a motor vehicle traction control system which includes a part-time transfer case that is interactively associated with an electronic control module and a speed sensor system for actuating an electromagnetic multi-disc clutch assembly upon the occurrence of a speed differential between the front and rear drive shafts that exceeds a predetermined maximum value. During such a low traction condition, the electromagnetic clutch is automatically actuated for placing the part-time transfer case into the "on-demand" four-wheel drive mode for a fixed period of time. At the end of the fixed time period, the electromagnetic clutch assembly is automatically de-actuated at a pre-set rate through pulse width modulation until the vehicle is returned to the two-wheel drive mode of operation. This control sequence is continuously monitored and repeated until normal traction is resumed with the vehicle in the two-wheel drive mode. Therefore, actuation of the "on-demand" four-wheel drive feature is automatic and independent of any vehicle operator input or action.

In accordance with another feature of the traction control system, the electromagnetic clutch assembly is "over-ridden" or "locked-out" upon the vehicle operator shifting the transfer case from the two-wheel drive mode to a part-time four-wheel drive mode. Moreover, the electromagnetic clutch assembly can be "locked out" in either of its actuated or de-actuated conditions. Once the clutch assembly is "locked out", the sensor system signals the electronic control module that no relative speed differential exists between the front and rear drive shafts. Thereafter, the electronic control module is operable for automatically de-actuating the clutch assembly or maintaining the clutch assembly in its de-actuated condition.

BRIEF DESCRIPTION OF THE DRAWINGS

Further objects, features and advantages of the present invention will become apparent from analysis of the following written specification, the accompanying drawings and the appended claims in which:

DETAILED DESCRIPTION OF THE INVENTION

Figure 1:
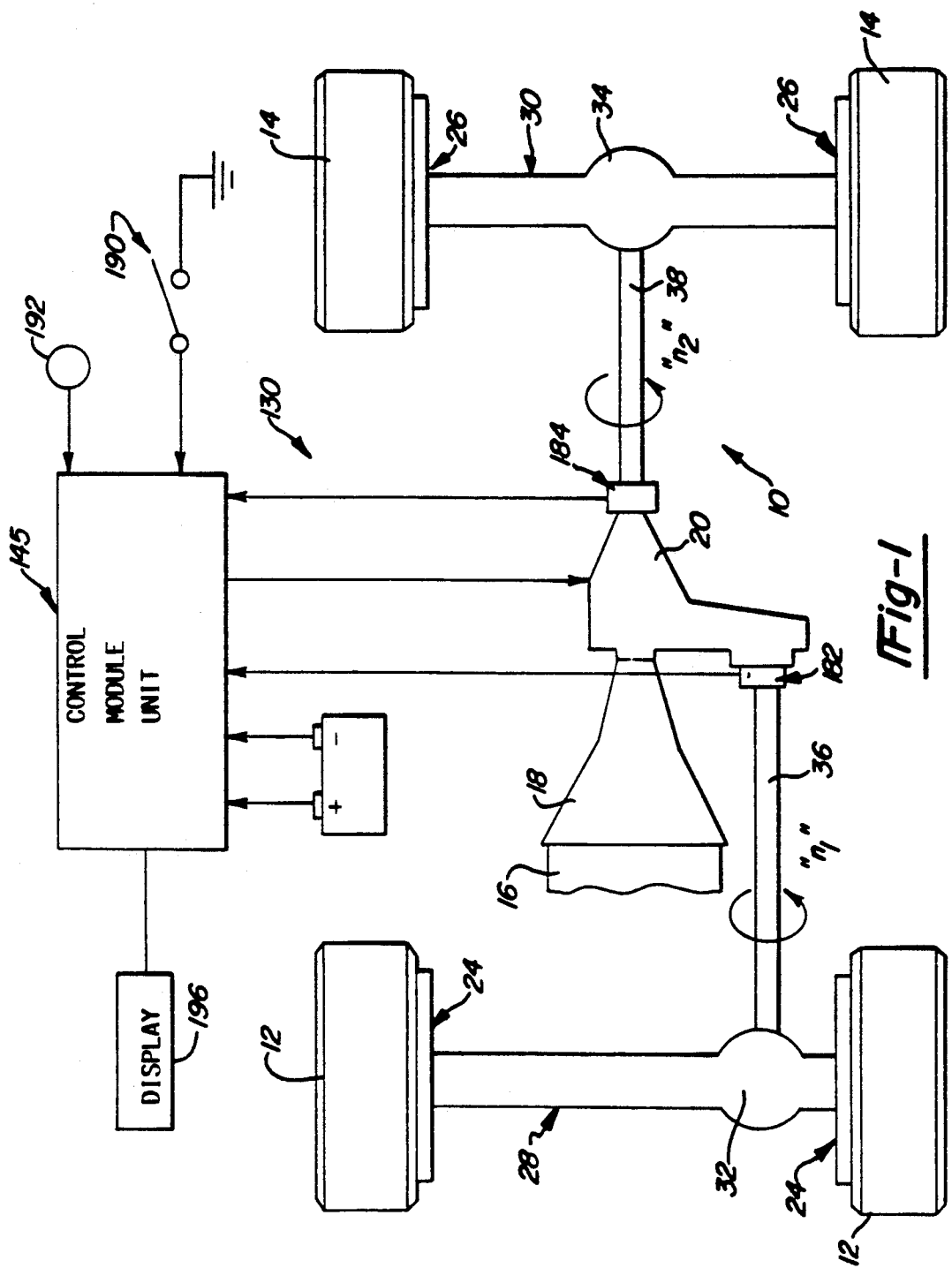
FIG. 1 is a schematic representation of the traction control system of the present invention shown to include a part-time transfer case incorporating an "on-demand" four-wheel drive feature.

Referring to FIG. 1, an exemplary motor vehicle drivetrain 10 of a type suited for use with the present invention is schematically shown. The motor vehicle drivetrain 10 has a pair of front wheels 12 and a pair of rear wheels 14 drivable from a source of power, such as an engine 16, through a transmission 18 which may be of either the manual or automatic type.

In the particular embodiment shown, drivetrain 10 is a rear wheel drive system which incorporates a part-time transfer case 20 operable to receive drive torque from transmission 18 for normally driving rear wheels 14 (i.e., the driven wheels) in a two-wheel drive mode of operation. In addition, part-time transfer case 20 is adapted to permit a vehicle operator to selectively transfer drive torque to front wheels 12 (i.e., the non-driven wheels) for defining a part-time four-wheel drive mode of operation.

Typically, front and rear wheels 12 and 14, respectively, have a common rolling radius and are part of front and rear wheel assemblies 24 and 26, respectively, which, in turn, are connected at opposite ends of front and rear axle assemblies 28 and 30, respectively. A front differential 32 is mechanically coupled between front axle assembly 28 and a front prop or drive shaft 36 such that front wheel assemblies 24 are driven by front drive shaft 36 when part-time transfer case 20 is operating in the four-wheel drive mode. Similarly, rear axle assembly 30 includes a rear differential 34 coupled in driven relationship to rear prop or drive shaft 38 for driving rear wheel assemblies 26. It is to be understood that the orientation of drivetrain 10 is merely exemplary in nature and that drivetrain 10 could be reversed for normally driving the front wheels in the two-wheel drive mode.

Figure 2:
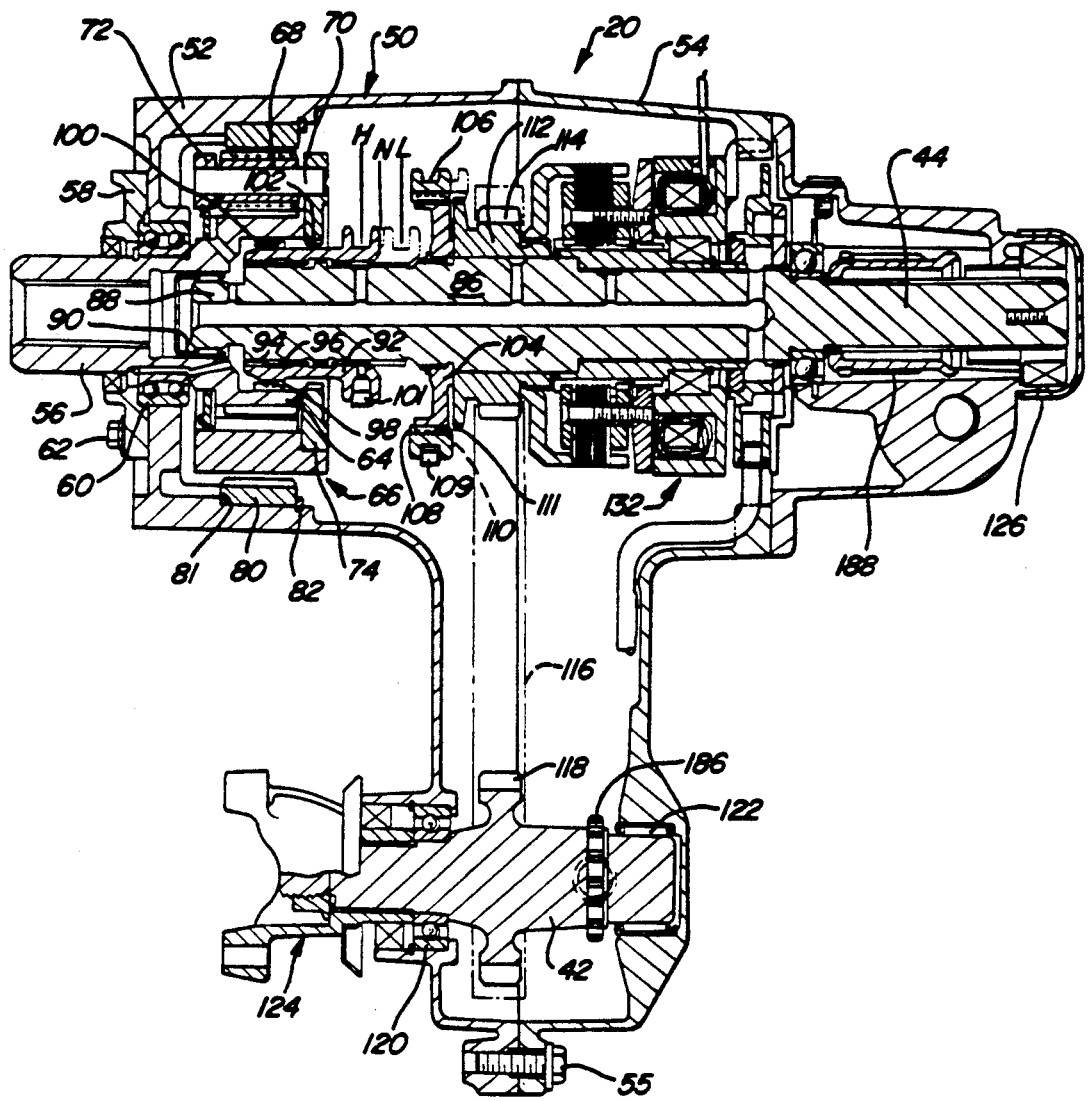
FIG. 2 is a cross-sectional view of the part-time transfer case showing the "on-demand" four-wheel drive feature of the present invention to include an electronically-controlled clutch assembly.

With reference to FIGS. 1 and 2, front and rear drive shafts 36 and 38, respectively, are adapted to be connected at their opposite ends to front and rear output members or shafts 42 and 44, respectively, of part-time transfer case 20. A transmission output shaft (not shown) couples transmission 18 to transfer case 20 for supplying power thereto. Part-time transfer case 20 is shown to include a housing 50 formed by front and back half sections 52 and 54, respectively, suitably interconnected by a plurality of threaded bolts 55. Front half section 52 receives the transmission output shaft within an internally splined input stub shaft 56. Input stub shaft 56 is shown rotatably mounted in a collar portion 58 by bearing assembly 60 with collar portion 58 secured by bolts 62 to housing front half section 52.

Input stub shaft 56 has an input sun gear 64 of a helical planetary gear set assembly 66, formed integral therewith. Planetary gear set assembly 66 is a speed reduction apparatus operable for preferably defining high, low and neutral range positions as will be described hereinafter. It will be appreciated that planetary gear set assembly 66 is merely exemplary of a suitable two-speed gear reduction apparatus for use in part-time transfer case 20. Sun gear 64 is shown meshed with a plurality of planet pinion gears 68. Each planet pinion gear 68 is rotatably journalled on a pin 70 supported in a planetary carrier. The planetary carrier includes fore and aft ring members 72 and 74, respectively, secured by bolts (not shown). Planet gears 68 mesh with a helical annulus gear 80 mounted via a press-fit to the inner surface of housing front section 52. Annulus gear 80 is additionally retained against rearward axial movement away from stop shoulder 81 by a snap ring 82.

An output shaft 86 is aligned on the longitudinal axis of input shaft 56 and has a pilot portion 88 journalled in input shaft axial bore 90. Output shaft 86 has a range collar 92 axially slidable thereon by means of collar internal splines 94 engaged with external splines 96 formed on output shaft 86. Range collar 92 is formed with external spline teeth 98 shown slidably engaged with sun gear internal spline teeth 100 located in an axial counterbore in the right or aft end of input shaft 56. Torque or power flow is transferred directly from input shaft 56 through engagement of teeth 98 and 100 in conjunction with the engagement of collar splines 94 and output shaft splines 96, thereby establishing the direct "high" range position indicated by the construction line "H".

Aft carrier ring 74 includes internal spur gear teeth 102 formed concentric with range collar 92. Aft carrier ring internal teeth 102 are placed in sliding meshed engagement with range collar external teeth 98 upon range collar 92 being slid rearwardly for defining the "low" drive range as indicated by the construction line "L" position of range collar 92. It will be noted that when range collar 92 is moved rearwardly a predetermined distance from its high range "H" position, its external teeth 98 are disengaged from sun gear internal teeth 100 and aft carrier ring internal teeth 102 for defining a "neutral" drive range position indicated by construction line "N". With part-time transfer case 20 shifted into neutral, rotation of input shaft 56 drives only planetary pinion gears 68 and carrier fore 72 and aft 74 rings around annulus gear 80. Thus, in the neutral position no torque is transmitted to output shaft 86, and thus no power is transmitted to the vehicle's rear wheels 14. As will be appreciated, range collar 92 is selectively shiftable via movement of a range fork, partially shown at 101, that is coupled to a conventional fork-type shift mechanism (not shown) in a known manner.

With continued reference to FIG. 2, means to mechanically shift part-time transfer case 20 between a two-wheel high-range drive mode and part-time four-wheel high-range drive mode will now be detailed. More particularly, such a mode shift arrangement includes a hub member 104 that is fixedly splined to output shaft 86 and an axially moveable mode sleeve 106 that is shown in a central disengaged or two-wheel drive mode position. Mode sleeve 106 is formed with internal spline teeth 108 which are in constant axial sliding engagement with external spline teeth 110 formed on hub 104. A mode fork, partially shown at 109, is coupled to mode sleeve 106 for permitting the vehicle operator to axially shift mode sleeve 106 via selective actuation of the shift mechanism. Thus, mode sleeve 106 may be selectively shifted from the two-wheel drive mode position to a part-time four-wheel drive mode position wherein internal spline teeth 108 drivingly engage external spline teeth 111 formed on a chain carrier 112. Chain carrier 112 also includes a drive sprocket 114 drivingly engaging a chain, shown in dashed lines at 116, which is coupled to a lower driven sprocket 118. In addition, drive sprocket 114 is journally supported for rotation on central output shaft 86 and driven sprocket 118 is, in turn, coupled to or an integral portion of front output shaft 42 of part-time transfer case 20. Front output shaft 42 is mounted for rotation within housing front half section 52 by ball bearing assembly 120 and housing rear half section 54 by roller bearing assembly 122. Furthermore, transfer case front output shaft 42 is operably connected via a first coupling 124 to the motor vehicle's front drive shaft 36. Similarly, rear output portion or shaft 44 of central output shaft 86 is suitably connected via a second coupling 126 to rear drive shaft 38.

During two-wheel drive operation of the motor vehicle, non-driven rotation of front wheels 12 causes concomitant rotation of front axle assembly 28, front drive shaft 36 and, in turn, front output shaft 42. As such, when the vehicle is moving in a substantially straight ahead direction, drive sprocket 114 is also rotatably driven (via driven sprocket 118 and chain 116) with virtually no speed differential with respect to central output shaft 86. Therefore, selective actuation of the shift mechanism causes mode sleeve 106 to be mechanically shifted such that transfer case 20 can be shifted "on-the-fly" from its two-wheel high-range drive mode to its part-time four-wheel high-range drive mode without the need of a conventional speed synchronization device. However, it is to be understood that the present invention is readily adapted for use with part-time transfer cases using virtually any type of synchronized mode shift system when the front axle assembly is of the split-shaft type such as that shown and described in U.S. Pat. No. 4,381,828 issued May 3, 1983 to Lunn. Likewise, it is also to be understood that the shift mechanism can be selectively shifted by the vehicle operator either manually (i.e., via a shift lever) or electrically (i.e., via a motor driven system). In either case, the shift mechanism is adapted to coordinate the movement of range collar 92 (via range fork 101) and mode sleeve 106 (via mode fork 109) to establish the two-wheel high-range mode, the part-time four-wheel high-range mode, a part-time four-wheel low-range mode, and a Neutral mode. An example of one suitable shift mechanism is described in commonly owned U.S. Pat. No. 5,076,112 to Williams, the disclosure of which is expressly incorporated by reference herein.

Figure 3:
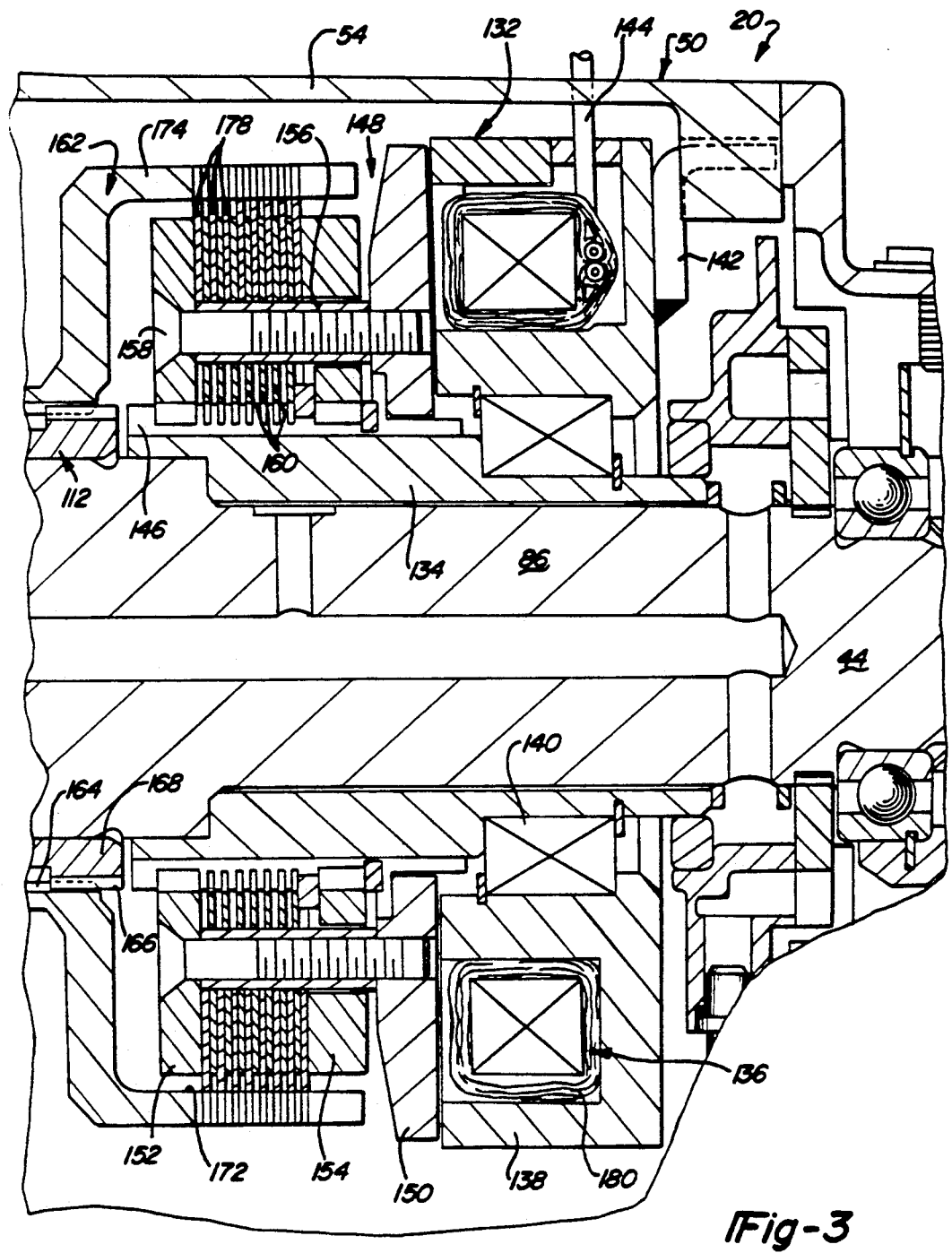
FIG. 3 is enlarged view of a portion of the clutch assembly shown in FIG. 2.

With reference now to FIG. 2 and 3, means are provided for automatically causing part-time transfer case 20 to operate in an "on-demand" four-wheel drive mode in a manner that is independent of any deliberate or intentional actuation of the shift mechanism by the vehicle operator. In general, part-time transfer case 20 is operably associated with a traction control system 130 and incorporates an "on-demand" four-wheel drive feature. More particularly, the "on-demand" four-wheel drive feature includes the incorporation of transfer clutch means within transfer case 20 for automatically transferring drive torque to front drive shaft 36 when traction is lost at driven rear drive shaft 38. According to a preferred embodiment, the transfer clutch means is an electronically controlled multi-disc electromagnetic clutch assembly 132, mounted within transfer case 20, that is operatively applied between chain carrier 112 and central output shaft 86.

Electromagnetic clutch assembly 132 includes an elongated clutch hub 134 fixedly splined to a portion of central output shaft 86 located intermediate chain carrier 112 and rear output shaft portion 44. A coil assembly 136 is housed within an annular portion of a pole assembly 138 which, in turn, is journally supported for non-rotation relative to elongated clutch hub 134 via ball bearing assembly 140. Moreover, a flanged mounting bracket 142 is fixedly secured to pole assembly 138 and is adapted to position and retain pole assembly 138 within housing 50 such that electrical cables 144 (shown interfaced with coil assembly 136) can be connected to a central electronic control module 145 to be described in greater detail hereinafter.

Clutch hub 134 is formed with longitudinally extending external splines 146. An axially moveable armature assembly 148 is splined to external hub splines 146 for rotation with central output shaft 86 and, in turn, rear output 44. Armature assembly 148 includes an armature ring 150 concentrically surrounding hub splines 146 and first and second rings 152 and 154, respectively, which are fixedly secured relative to one another and to armature ring 150 by a plurality of spacer tubes 156 and bolts 158. A first plurality of inner clutch disc or plates 160 are splined to external splines 146 of clutch hub 134 intermediate first and second rings 152 and 154 and, as such, are axially moveable with armature assembly 148 upon controlled energization and de-energization of coil assembly 136 as will be described.

Electromagnetic multi-disc clutch assembly 132 also includes an outer cup-shaped housing 162 concentrically disposed about central output shaft 86 and which is operable to rotatably drive, or be driven by, chain carrier 112. More particularly, a central aperture formed in outer housing 162 has internal splines 164 formed thereon which are adapted to meshingly engage external splines 166 formed on a radially extending flange portion 168 of chain carrier 112. An inner surface 172 of axially extending wall portion 174 of outer housing 162 is formed with longitudinal keys or splines (not shown) for coupling a second plurality of outer clutch disc or plates 178 thereto. In addition, outer clutch plates 178 are interleaved with inner clutch plates 160 to provide a predetermined "pack" spacing therebetween.

As will be appreciated, when windings 180 of coil assembly 136 are energized upon application of electrical current thereto, lines of electromagnetic flux are generated which act to draw armature ring 150 and, in turn, armature assembly 148 toward coil assembly 136. Armature assembly 148 is normally biased away from coil assembly 136 via one or more biasing springs (not shown) so as to define a maximum air gap therebetween when windings 180 are not energized. Thus, upon sufficient energization of coil windings 180, armature assembly 148 is drawn axially toward coil assembly 136 in opposition to the biasing action of the biasing springs for causing frictional engagement of inner and outer clutch plates 160 and 178, respectively. Due to the frictional engagement of the interleaved plates, outer drum housing 162 is drivingly coupled to elongated clutch hub 134 and, in turn, chain carrier 112 is driven by central output shaft 86 for delivering torque to front drive shaft 36.

In accordance with the teachings of the present invention, traction control system 130 is operable for automatically actuating clutch assembly 132 for placing part-time transfer case 20 into the "on-demand" four-wheel drive mode during occurrences of slippage of rear axle assembly 30 that are typically associated with low tractive road conditions. In general, traction control system 130 functions to monitor and control operation in the "on-demand" four-wheel drive mode in a manner that is independent of any deliberate shifting movement of mode sleeve 106 by the vehicle operator. More particularly, traction control system 130 includes first speed sensing means, generally identified in FIG. 1 by reference numeral 182, which is provided to detect and measure the non-driven rotational speed "$n_1$" of front drive shaft 36 and generate a signal indicative thereof. Traction control system 130 further includes second speed sensing means, generally shown at 184, that is provided to detect and measure the rotational speed "$n_2$" of rear drive shaft 38 and generate a signal indicative thereof. While first and second speed sensing means 182 and 184, respectively, are schematically shown in FIG. 1 as being positioned intermediate their respective transfer case outputs and drive shafts, it is preferable that the speed sensing means be incorporated directly into transfer case 20. For example, as seen in FIG. 2, front and rear tone wheels 186 and 188, respectively, are shown fixedly coupled for rotation with front and rear transfer case outputs 42 and 44, respectively. Front and rear hall effect sensors (not shown) are used in conjunction with front and rear tone wheels 186 and 188, respectively, for sensing the rotational speed of each respective output shaft and, in turn, each corresponding drive shaft. Thereafter, the speed signals "$n_1$" and "$n_2$" are delivered to control module 145 for processing. However, it is to be understood that any suitable speed sensing devices capable of generating a signal respresentative of the rotational speed of a shaft is within the fair scope of the present invention.

A brake switch 190, schematically shown in FIG. 1, provides an additional input signal to control module 145 indicating whether the vehicle operator is applying the brakes so as to prevent "on-demand" operation simultaneous therewith. In addition, control module 145 is also adapted to receive an input signal from the vehicle ignition switch, shown at 192, that is indicative of the operational status of engine 16. Electronic control module 145 is adapted to receive the electrical input signals "$n_1$" and "$n_2$" generated by the first and second speed sensors means 182 and 184, respectively, as well as the additional input signals from brake switch 190 and ignition switch 192. Control module 145 includes electronic circuit means for comparing speed signals "$n_1$" and "$n_2$" and for making controlled output decisions in response thereto. As will be detailed, the output decisions are used to selectively control the actuation of electromagnetic clutch assembly 132 during certain low traction conditions for providing the "on-demand" four-wheel drive mode.

Electronic control module 145 is preferably a microprocessor device having information storage capabilities. Furthermore, control module 145 is powered by the motor vehicle battery, shown at 194, and is adapted to handle sufficient voltage and current to actuate clutch assembly 132. Also, control module 145 is operable for illuminating a display lamp, shown at 196, that is located within the passenger compartment to inform the vehicle operator of the "on-demand" four-wheel drive condition.

Figure 4:
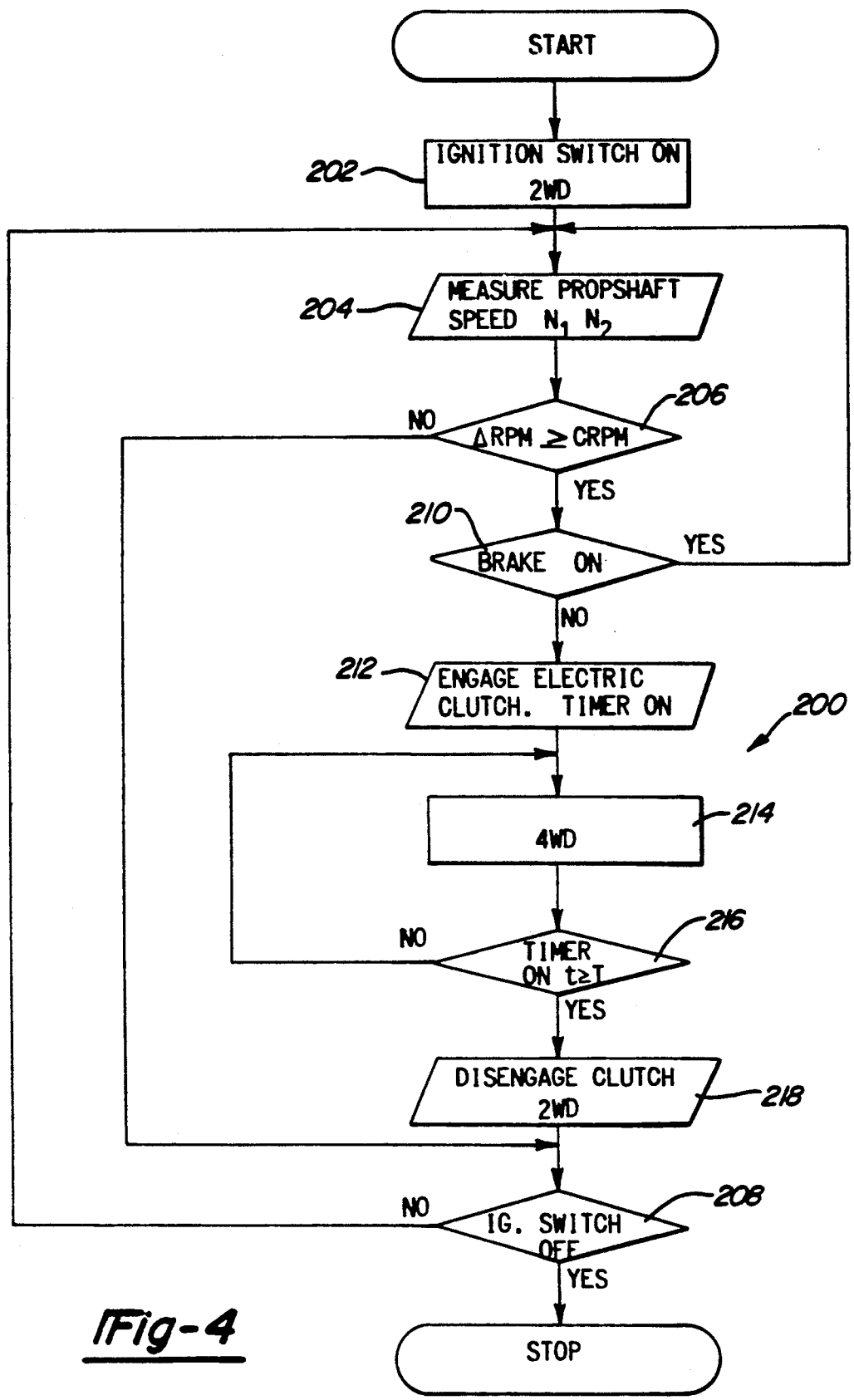
FIG. 4 is a block diagram representing the control sequence associated with automatic actuation of the "on-demand" four-wheel drive feature.

With reference now to FIG. 4, the control sequence for automatically causing "on-demand" four-wheel drive upon actuation of clutch assembly 132 via traction control system 130 is disclosed in block diagram 200. More specifically, block diagram 200 represents a preferred control logic programmed into or associated with the circuit means of control module 145. Block 202 is indicative of the input signal generated by ignition switch 192 for signalling control module 145 that the motor vehicle is operational. Block 204 is representative of the control step in which first and second speed sensor means 182 and 184, respectively, detect and measure the rotational speed of front and rear outputs 42 and 44, respectively and, in turn, of front and rear drive shafts 36 and 38, respectively. Thereafter, the input signals "$n_1$" and "$n_2$" are delivered to control module 145 where they are appropriately processed and compared for generating a speed differential signal ($\Delta$RPM).

As shown in block 206, control module 145 is operable to compare the speed differential signal ($\Delta$RPM) with stored information to determine if the speed differential signal ($\Delta$RPM) equals or exceeds a predetermined threshold maximum value (CRPM). The threshold maximum value (CRPM) is selected to permit a normal amount of interaxle speed differentiation of the type typically associated with the motor vehicle being steered into a tight turn or corner. As will be appreciated, the steerable wheels (i.e. front wheels 12) travel along a larger radius than the non-steerable wheels (i.e. rear wheels 14). Therefore, the maximum threshold value (CRPM) is selected to permit normal interaxle speed differentiation without causing "on-demand" four-wheel drive via actuation of electromagnetic clutch assembly 132.

As noted, block 206 illustrates the comparison operation wherein the measured speed differential signal ($\Delta$RPM) is compared to the maximum threshold level (CRPM). If the value of the speed differential signal ($\Delta$RPM) is less than the maximum threshold level (CRPM) and ignition switch 192 signals control module 145 that the vehicle is still operational, as shown in block 208, then the control routine returns to blocl 204 to be repeated in a continuous manner. Block 210 is indicative of the input signal generated by brake switch 190 which is delivered to control module 145. Accordingly, if the vehicle operator is attempting to stop the vehicle (by applying the brakes) during an occurrence of a low traction road condition (that is, $\Delta$RPM $\geq$ CRPM) then brake switch 190 signals traction control system 130 to prevent actuation of clutch assembly 132 for disabling the "on-demand" four-wheel drive feature. This control sequence prevents simultaneous braking and "on-demand" four-wheel drive for providing the vehicle operator with greater control. However, during the occurrence of a low traction condition (where $\Delta RPM \geq CRPM$) when brake switch 190 signals control module 145 that the vehicle operator is not applying the brakes, electronic control module 145 automatically energizes coil windings 180 for actuating clutch assembly 132 as shown in block 212.

As previously noted, actuation of clutch assembly 132 is caused upon energization of coil windings 180 for automatically placing transfer case 20 in the "on-demand" four-wheel drive mode (Block 214). As is known, the magnitude of the electromagnetic "attractive" force generated between armature ring 150 and coil assembly 136 of clutch assembly 132 is proportional to the magnitude (i.e., percentage duty cycle) of the control signal applied to coil windings 180 by control module 145. Thus, the amount of drive torque transferred through clutch assembly 132 to front output 42 is also proportional to the magnitude of the control signal. As such, the distribution ratio of drive torque between front output 42 and rear output 44 of part-time transfer case 20 may be selectively varied as a function of changes in the magnitude of the control signal for optimizing the tractive performance characteristics associated with the "on-demand" four-wheel drive mode. As shown in block 216, a timer circuit within control module 145 is actuated simultaneously with energization of coil windings 180 for maintaining the energization of coil windings 180 for a predetermined set time (T). Once the period of energization (t) equals the predetermined time period (T) (or $t \geq T$), control module 145 de-energizes coil windings 180 for disengaging clutch assembly 132 (Block 218) so as to return the motor vehicle to a two-wheel drive mode of operation.

According to the preferred embodiment, energization of coil windings 180 causes axial movement of armature assembly 148 toward coil assembly 136 for frictionally "locking-up" the interleaved clutch plates which, in turn, couples chain carrier 112 to output shaft 86 for transmitting driving torque to front drive shaft 36. More preferably, control module 145 is programmed to actuate clutch assembly 132 to a predetermined torque level and then modulated actuation thereof to prevent clutch assembly 132 from damage if the torque developed exceeds the predetermined limit. Thereafter, clutch assembly 132 is de-actuated at a preset rate via pulse width modulation until the vehicle is operating again in its two-wheel drive mode.

Figure 5:
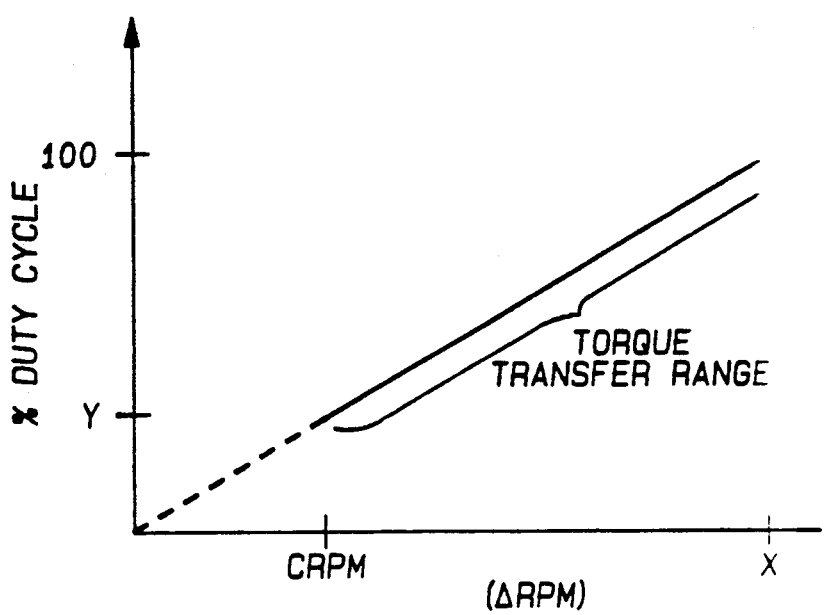
FIG. 5 is an exemplary plot of a relationship between the duty cycle of a control signal applied to the clutch assembly and a speed differential signal.
Figure 6:
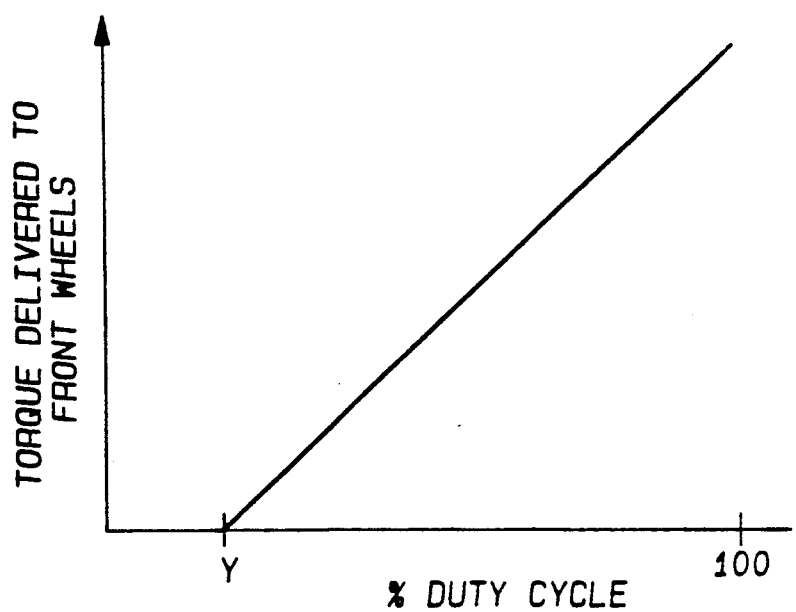
FIG. 6 is an exemplary plot of a relationship between the drive torque delivered to the non-driven wheels and the value of the control signal.
Figure 7:
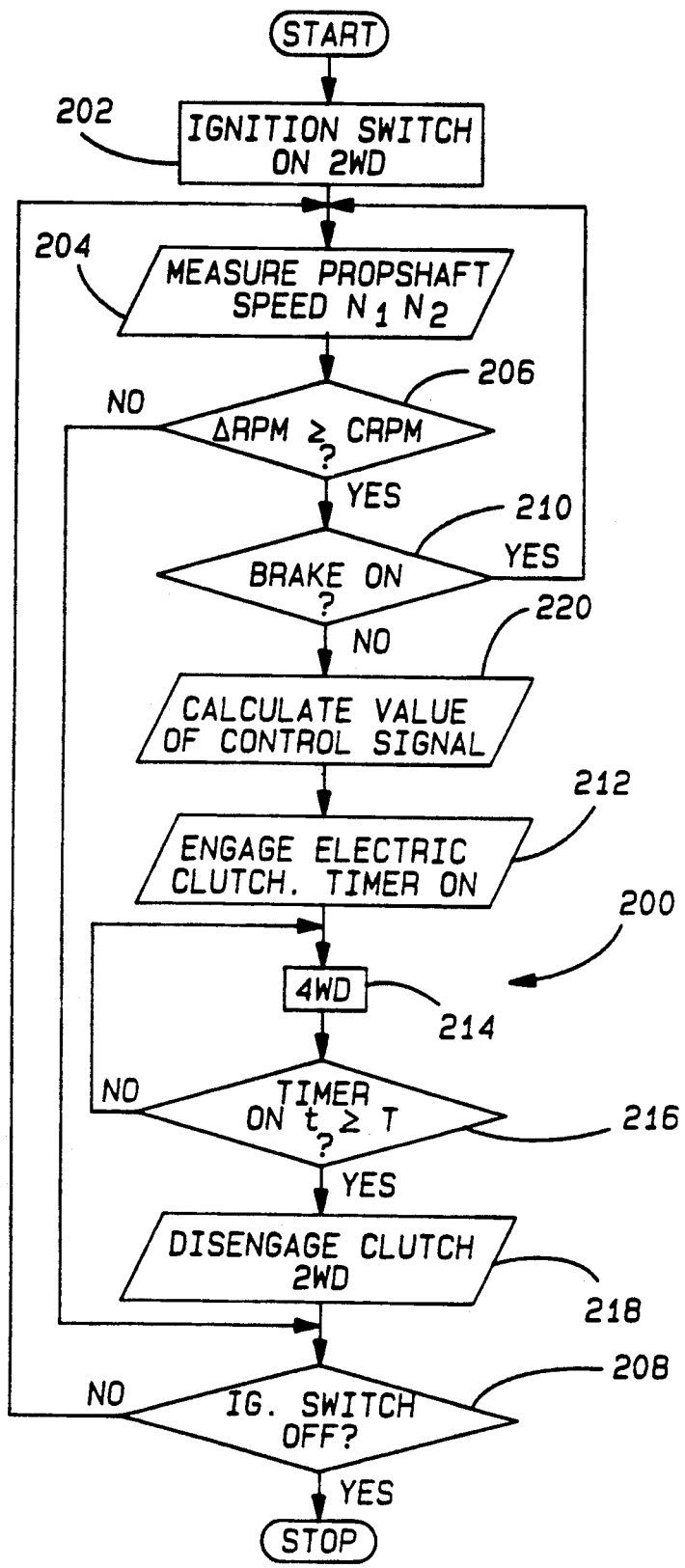
FIG. 7 is a modified version of the block diagram shown in FIG. 4 representing the control sequence for modulating the drive torque distribution ratio as a function of the speed differential signal.

As an additional feature of the present invention, traction control system 130 is operable for modulating the distribution ratio of drive torque between front output 42 and rear output 44 of transfer case 20 in proportion to changes in the value of the speed differential signal ($\Delta RPM$). With particular reference to FIGS. 5 through 7, an exemplary relationship between the drive torque transferred across clutch assembly 132 and the speed differential signal ($\Delta RPM$) will now be detailed. As best seen from FIG. 5, traction control system 130 can be programmed to linearly correlate the percentage duty cycle of the electric control signal applied to coil assembly 136 to a range of speed differential signal ($\Delta RPM$) values. In general, the percentage duty cycle for the control signal increases linearly from a minimum actuation value (Y%) to a maximum actuation value (100%) as the value of the speed differential signal ($\Delta RPM$) increases from a minimum differential limit, preferably defined as the threshold level (CRPM), to a maximum differential limit (X). As previously noted, when the value of the speed differential signal ($\Delta RPM$) is less than the predetermined threshold (CRPM), no drive torque is transferred through clutch assembly 132 to front output 42. Thus, the minimum actuation duty cycle (Y%) for the control signal correlates to the point at which the attractive force generated upon energization of coil windings 180 is sufficient to overcome the biasing action of the biasing springs for causing initial frictional engagement between the interleaved clutch plates 160 and 178. In this manner, such frictional engagement results in the delivery of a portion of the total drive torque to front output 42 of transfer case 20 so as to establish initiation of the "on-demand" four-wheel drive mode. In addition, the maximum value (X) of the speed differential signal ($\Delta RPM$) correlates to the maximum actuation duty cycle (100%) at which point the maximum electromagnetic attractive force is generated.

As best seen from FIG. 6, an exemplary linear relationship between the magnitude of the duty cycle supplied to coil assembly 136 and the magnitude of the drive torque transferred through clutch assembly 132 to front output 42 is clearly shown. As is apparent, the "on-demand" four-wheel drive mode is established upon supplying a control signal having a duty cycle value greater than (Y%) to coil assembly 136 of clutch assembly 132. More specifically, the portion of the total drive torque transferred through clutch assembly 132 to front output 42 increases linearly as the magnitude of the duty cycle for the control signal increases from the minimum actuation value (Y%) to the maximum actuation value (100%). With reference to FIG. 7, a modified version of the control sequence shown in FIG. 4 is presented for automatically modulating the drive torque as a function of the speed differential signal. More particularly, an additional control step, identified as block 220, is shown in association with the circuit means of control module 145 for calculating the magnitude (i.e., percentage duty cycle) of the control signal as a function of the value of the speed differential signal ($\Delta RPM$). As noted, electronic control module 145 has information storage capability such that a look-up table compiled of the relationship data of FIG. 5, or a simple arithmetic circuit, could be employed for calculating the proper magnitude of the control signal sent to block 212.

In accordance with another primary feature of traction control system 130, clutch assembly 132 can be selectively "over-ridden" or "locked-out" upon the vehicle operator shifting (either manually or electrically) mode sleeve 106 from the two-wheel drive mode position to the part-time four-wheel drive mode position. As such, clutch assembly 132 can be effectively "locked-out" in either of its actuated (coil windings 180 energized) or non-actuated (coil windings 180 de-energized) operative conditions. In either case, upon clutch assembly 132 being "over-ridden", the input signals "$n_1$" and "$n_2$" generated by first and second speed sensor means 182 and 184, respectively, signal electronic control module 145 that no relative speed differential exists ($\Delta RPM = 0$) between front drive shaft 36 and rear drive shaft 38. Therefore, since the value of the speed differential signal ($\Delta RPM$) is less than the maximum threshold value (CRPM), electronic control module 145 automatically de-actuates clutch assembly 132 during "on-demand" four-wheel drive operation. Likewise, control module 145 is also operable to maintain clutch assemble 132 in its de-actuated condition when the vehicle operator shifts mode sleeve 106 into the part-time four-wheel drive mode position during normal driving conditions.

The foregoing discussion discloses and dscribes exemplary embodiments of the present invention. One skilled in the art will readily recognize from such discussion, and from the accompanying drawings and claims, that various changes, modifications and variations can be made therein without departing from the true spirit and fair scope of the invention as defined in the following claims. For example, it is optional to use a multi-disc friction clutch or any other transfer clutch that can be controllably actuated in place of the electromagnetic clutch assembly of the illustrated embodiments.

What is claimed is:

1. A traction control system for a motor vehicle having an engine and first and second sets of wheels, comprising:
   power transfer means for transferring drive torque from the engine to the first set of wheels for defining a two-wheel drive mode and which is adapted to permit a vehicle operator to selectively transfer drive torque to the second set of wheels for defining a four-wheel drive mode, said power transfer means having a clutch assembly for transferring drive torque to the second set of wheels when operating in said two-wheel drive mode for defining an on-demand four-wheel drive mode;
   first sensor means for sensing the rotational speed of the first set of wheels and generating a first input signal indicative thereof;
   second sensor means for sensing the rotational speed of the second set of wheels and generating a second input signal indicative thereof; and
   control means for generating an output signal in response to said first and second input signals that is indicative of a speed differential between the first and second sets of wheels, said control means being operable for actuating said clutch assembly so as to vary the magnitude of said drive torque transferred to the second set of wheels in response to the value of said output signal, said control means further operable for de-actuating said clutch assembly in response to said vehicle operator shifting said power transfer means from said two-wheel drive mode into said four-wheel drive mode.

2. The traction control system of claim 1 wherein said power transfer means is a part-time transfer case having a first output portion interconnected to the first set of wheels and a second outout portion interconnected to the second set of wheels, and wherein said clutch assembly is in electronically controlled clutch assembly operably installed between said first and second output portions of said part-time transfer case.

3. The traction control system of claim 2 wherein said first sensor means is operable for sensing the rotational speed of said first output portion of said part-time transfer case, and said second sensor means is operable for sensing the rotational speed of said second output portion of said part-time transfer case, said control means being operable to receive said input signals from each of said first and second sensor means and generate said speed differential output signal in response thereto, and wherein said control means is adapted to automatically actuate said clutch assembly when said speed differential output signal exceeds a predetermined minimum value independently of any deliberate action by said vehicle operator.

4. The traction control system of claim 3 wherein said control means actuates said clutch assembly for linearly increasing the magnitude of drive torque transferred through said clutch assembly to said second output portion of said transfer case in response to increasing values of said speed differential signal between said predetermined minimum value and a predetermined maximum value.

5. The traction control system of claim 3 further comprising brake sensor means for providing a third input signal to said control means that indicates when said vehicle operator is applying the brakes, said control means being operable for inhibiting actuation of said clutch assembly during application of the brakes.

6. The traction control system of claim 5 wherein said control means is an electronic control module having circuit means for processing said input signals from each of said first and second sensor means and said brake sensor means, said circuit means including a timer circuit for signalling said control module to maintain said clutch assembly in an actuated condition for a predetermined time period, and for de-actuating said clutch assembly following expiration of said predetermined time period.

7. The traction control system of claim 1 wherein said clutch assembly can be selectively locked-out in either of said actuated or de-actuated conditions in response to said vehicle operator shifting said part-time transfer case into said four-wheel drive mode of operation.

8. The traction control system of claim 1 wherein said control means is operable to control a drive torque distribution ratio defined by the ratio of said drive torque transmitted to the second set of wheels to said drive torque transmitted to the first set of wheels, said ratio increasing linearly as a function of increasing values of said output signal.

9. In a vehicle having a first set of wheels and a second set of wheels adapted to be driven from a source of power, a traction control system comprising:
   a part-time transfer case operable for receiving application of drive torque from said source of power and normally transferring said drive torque to the first set of wheels for defining a two-wheel drive mode, said transfer case further adapted to permit a vehicle operator to selectively transfer drive torque to the second set of wheels in addition to said first set of wheels for defining a four-wheel drive mode;
   first drive means interconnecting a first output of said transfer case to the first set of wheels;
   second drive means interconnecting a second output of said transfer case to the second set of wheels;
   first sensor means for sensing the rotational speed of said first drive means and generating a first input signal indicative thereof;
   second sensor means for sensing the rotational speed of said second drive means and generating a second input signal indicative thereof;
   clutch means operable for automatically coupling said second output to said first output for transferring drive torque to the second set of wheels to define an on-demand four-wheel drive mode; and
   control means for receiving said first and second input signals and generating an output signal in response thereto that is indicative of a speed differential between said first and second drive means, said control means operable for actuating said clutch means to vary the magnitude of drive torque transferred to said second output through said clutch means as a function of the value of said output signal, said control means further operable for de-actuating said clutch means in response to said vehicle operator shifting said transfer case into said four-wheel drive mode.

10. The traction control system of claim 9 wherein said clutch means is an electrically controlled clutch assembly operably installed between said first and second outputs of said part-time transfer case, and wherein said control means is an electronic control module having circuit means for processing said signals from each of said first and second speed sensor means and generating said control signal in response thereto, said circuit means including a timer circuit for signalling said control module to maintain said clutch assembly in an actuated condition for a predetermined time period, and for de-actuating said clutch assembly following expiration of said predetermined time period.

11. The traction control system of claim 9 wherein said control means is operable to automatically modulate the drive torque distribution ratio transferred between said first and second outputs of said transfer case as a linear function of changes in the value of said control signal.

12. The traction control system of claim 9 wherein said first drive means comprises a front axle assembly such that said motor vehicle is normally a front wheel drive vehicle.

13. The traction control system of claim 9 wherein said first drive means comprises a rear axle assembly such that said motor vehicle is normally a rear wheel drive vehicle.

14. The traction control system of claim 9 wherein said clutch assembly can be selectively locked-out in either of said actuated or de-actuated condition in response to said vehicle operator shifting said transfer case into said four-wheel drive mode.

15. A method for providing an on-demand four-wheel drive mode under low tractive conditions, said method comprising the steps of:

providing a motor vehicle with a drivetrain having a source of power, a speed gear transmission driven by said source of power, and a transfer case for receiving said drive torque from said transmission for normally driving a first set of wheels in a two-wheel drive mode of operation, and said transfer case adapted to transfer drive torque to a second set of wheels upon being selectively coupled therewith for defining a four-wheel drive mode of operation;

providing a clutch assembly between first and second output portions of said transfer case;

connecting a first drive mechanism between said first output portion of said transfer case and said first set of wheels;

connecting a second drive mechanism between said second output portion of said transfer case and said second set of wheels;

sensing the speed differential between said first and second drive mechanism and generating a speed differential signal indicative thereof;

controlling actuation of said clutch assembly for varying the magnitude of said drive torque transferred through said clutch assembly to said second output portion of said transfer case as a function of the value of said speed differential signal; and de-actuating said clutch assembly when said transfer case is selectively shifted from said two-wheel drive mode into said four-wheel drive mode.

16. The method of claim 15 further comprising the step of locking-out said clutch assembly in either of said actuated or de-actuated conditions in response to said transfer case being shifted into said four-wheel drive mode.

17. The method of claim 15 further comprising the step of initiating the transfer of drive torque to said second output portion in response to said speed differential signal exceeding a predetermined minimum value.

18. The method of claim 17 wherein said controlling step includes linearly increasing the magnitude of said drive torque transferred through said clutch assembly to said second output portion of said transfer case in response to increasing values of said speed differential signal between said predetermined minimum value and a predetermined maximum value.

* * * * *